UNITED STATES PATENT OFFICE.

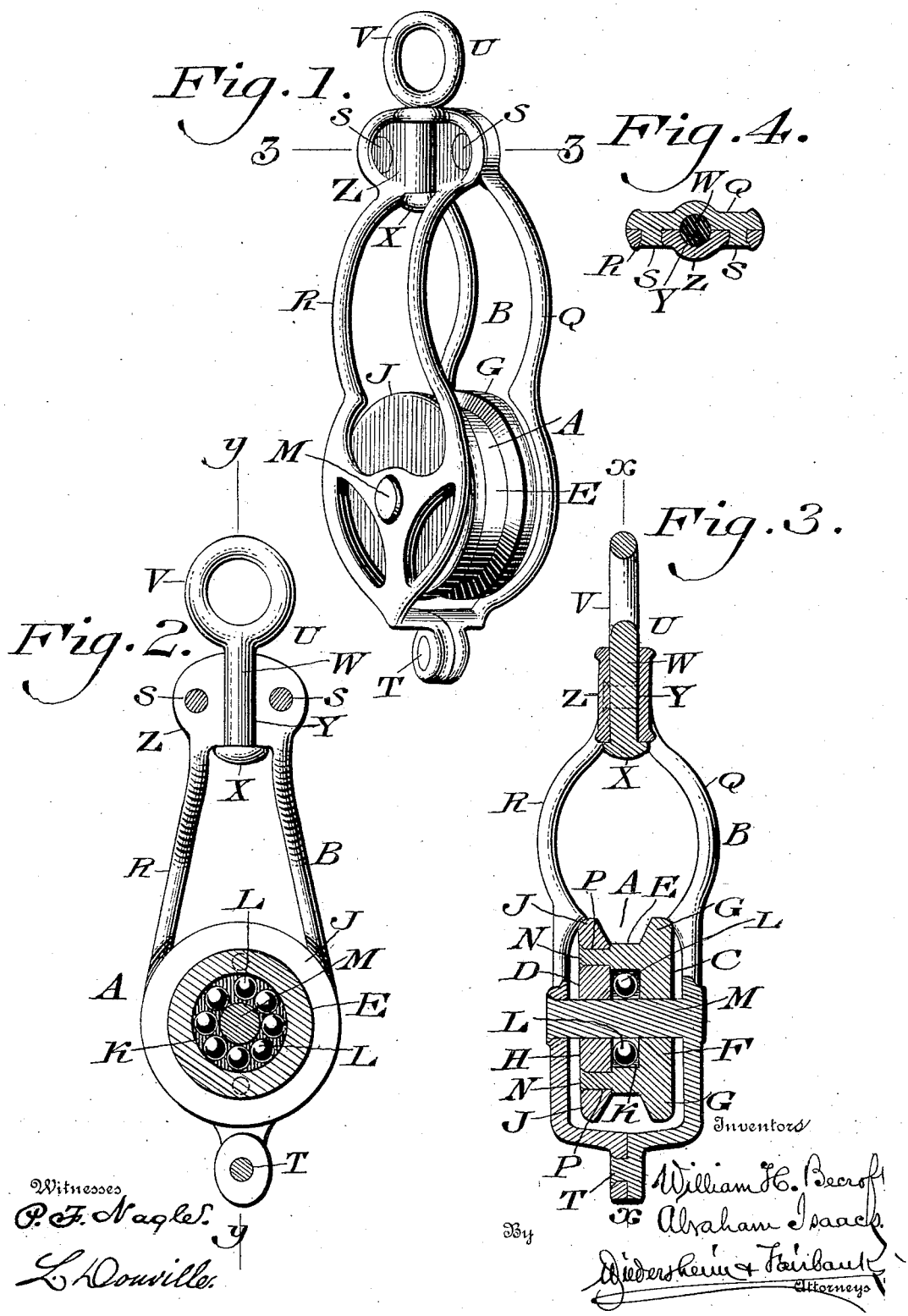

WILLIAM H. BECROFT AND ABRAHAM ISAACS, OF WEST HOBOKEN, NEW JERSEY.

PULLEY.

No. 870,340.　　　　Specification of Letters Patent.　　　　Patented Nov. 5, 1907.

Application filed April 26, 1907. Serial No. 370,367.

*To all whom it may concern:*

Be it known that we, WILLIAM H. BECROFT and ABRAHAM ISAACS, citizens of the United States, and residents of West Hoboken, in the county of Hudson, State of New Jersey, have invented a new and useful Pulley, of which the following is a specification.

Our invention consists of an improvement in a pulley for a line, rope etc., embodying ball bearings for the wheel or roller of the pulley, forming said wheel in sections for admission to said bearings and the chamber containing the same, means for connecting said sections in a firm and durable manner, forming the supporting frame in sections for conveniently assembling the parts of the device, and means for connecting said sections in a firm and durable manner.

Figure 1 represents a perspective view of a pulley embodying our invention. Fig. 2 represents a central vertical section thereof, on line x—x, Fig. 3. Fig. 3 represents a central vertical section thereof, on line y—y, Fig. 2. Fig. 4 represents a horizontal section, on line z—z, Fig. 1.

Similar letters of reference indicate corresponding parts in the figures.

Referring to the drawings: A designates the wheel or roller of the pulley, and B designates the supporting frame therefor at the sides thereof.

The wheel A is formed of sections C and D, the section C consisting of the central portion E of the wheel, one side F and the rim G thereof. The section D comprises the other side H and the rim J of the wheel.

The central portion E of the wheel is hollow, forming the chamber K, in which is a number of balls L, which latter encircle the axle M of the wheel, thus forming ball bearings for the latter, said axle being connected with the side members of the frame B.

The sections C, D of the wheel are primarily separate, so that access may be had to the chamber K to admit the balls thereinto, after which said sections are connected as one. For this purpose, we employ the pins or rivets N, which project laterally from the central portion E of the wheel, and are cast or otherwise formed integral therewith, they passing through openings P in the section D and having their ends headed on the exterior of the side of the latter, thus firmly connecting the sections C, D, and producing a wheel of strong structure, it being noticed that the section C thereof is not pierced for the insertion of the rivets N, but left integral where the latter project, the effect of which is evident.

The frame B is formed in sections Q and R, which are connected at top by pins or rivets S, at bottom by the pin or rivet T, and intermediate thereof by the axle M of the wheel A, it being noticed that said rivets and the axle M are cast or otherwise formed integral with one section of the frame, passed through openings in the other section thereof and headed on the exterior of the side of the latter, thus firmly connecting the members of the frame and producing a strong structure, it being noticed that one section is not pierced for the insertion of the rivets S, T and axle M, but left integral where said members project, the effect of which is evident.

Before the assembly of the members of the frame, the device or hanger U, by which the device is suspended or held in position, is applied at the upper end of the same, said hanger consisting of the eye V, the shank W, and shoulder X, the eye being at top, the shank W freely occupying the recess Y within the upper portion Z of the frame B, and the shoulder X being at bottom and bearing against the under end of said recess, said hanger thus being swiveled in position so as to permit the device to turn thereon, while the hanger is firmly connected with the frame.

While we have specified certain means for carrying out our improvements, we do not wish to be limited exactly to the same, but desire to make such changes as may come within the scope of the novelty involved.

Having thus described our invention, what we claim as new and desire to secure by Letters Patent, is:—

1. In a pulley, a sectional wheel or roller having a chamber, a plurality of balls in said chamber, an axle passed through said sections and chamber and in direct contact with said balls, means integral with one of said sections and connecting said sections upon opposite sides of said balls, and a suspension support for said axle.

2. In a pulley, a sectional wheel or roller, an axle therefor, a sectional suspension support for said axle with one section of which said axle is integral, a series of balls interposed between said wheel and axle, and means joining the wheel sections upon opposite sides of the said balls and with which they directly engage.

3. In a pulley, a sectional wheel or roller, an axle therefor, a suspension support for said axle with which the latter is integral, said wheel being provided with a chamber around the axle, balls in said chamber and adapted to roll in direct contact with said axle, and means integral with one of the wheel sections connected with the other section and against which said balls roll in direct contact.

4. In a pulley, a wheel or roller formed of sections, an axle for said wheel, one of said sections being provided with a chamber around said axle, the other section being adapted to close said chamber, and a ball-bearing occupying said chamber, a support for said axle and means for connecting said sections as one and against which the balls directly roll.

5. In a pulley, a wheel or roller formed of sections with alined openings for an axle, and rims, and rivets integral with one section adapted to pass through the other section and be connected therewith and a support for said axle.

6. In a pulley, a wheel or roller, an axle therefor, and a support for said axle, said support being formed in sections, and said axle being integral with one of said sections and being adapted to pass entirely through the other section and be connected therewith.

7. In a pulley, a wheel or roller, an axle therefor, a support for said axle, said support being formed in sections, and rivets respectively integral with one of said sections and being adapted to pass entirely through the other section and be connected therewith, and means integral with one of said sections connecting said sections at their lower end.

8. In a pulley, a wheel or roller, an axle therefor, a support for said axle, said support being formed in sections, and means for connecting said sections, said means and said axle being integral with one of said sections and adapted to pass entirely through the other section and be connected therewith, and means integral with one of said sections connecting said sections at their lower end.

9. In a pulley, a wheel or roller, an axle therefor, said wheel having a chamber around said axle, a ball-bearing in said chamber, a support for said axle, said wheel being formed in sections having integral means for connecting them as one, and said support being formed in sections having integral means for connecting them as one.

WILLIAM H. BECROFT.
ABRAHAM ISAACS.

Witnesses:
  LOUIS ENGELBERG,
  JOHN RAYMOND.